(12) United States Patent
McShane et al.

(10) Patent No.: US 7,844,840 B2
(45) Date of Patent: Nov. 30, 2010

(54) ARRANGEMENTS FOR INTEGRATED CIRCUIT POWER MANAGEMENT

(75) Inventors: Erik A. McShane, Phoenix, AZ (US); Sihin Seyfou, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 11/731,438

(22) Filed: Mar. 30, 2007

(65) Prior Publication Data

US 2008/0238655 A1 Oct. 2, 2008

(51) Int. Cl.
*G06F 1/00* (2006.01)
*G05F 1/577* (2006.01)
*G05F 1/00* (2006.01)

(52) U.S. Cl. .................. 713/300; 713/330; 324/426; 323/266; 323/272

(58) Field of Classification Search .............. 713/300, 713/330; 324/426; 323/272, 266
See application file for complete search history.

(56) References Cited

U.S. PATENT DOCUMENTS

| | | | | |
|---|---|---|---|---|
| 5,811,962 | A * | 9/1998 | Ceccherelli et al. ........ 323/282 |
| 7,100,058 | B1 * | 8/2006 | Tomlinson et al. .......... 713/300 |
| 7,313,706 | B2 * | 12/2007 | Williams et al. ............ 713/300 |
| 7,376,854 | B2 * | 5/2008 | Lehwalder et al. .......... 713/330 |
| 7,456,617 | B2 * | 11/2008 | Chapuis et al. ............. 323/267 |
| 2004/0130302 | A1 * | 7/2004 | Ostojic ....................... 323/272 |
| 2005/0057875 | A1 * | 3/2005 | Kover et al. ................ 361/93.1 |
| 2006/0033647 | A1 * | 2/2006 | Leung et al. ................... 341/50 |

OTHER PUBLICATIONS

U.S. Appl. No. 10/816,438, filed Jun. 10, 2005, Lehwalder, Philip, Mar. 31, 2004.

* cited by examiner

*Primary Examiner*—Vincent T Tran
(74) *Attorney, Agent, or Firm*—Schubert Law Group PLLC; Neil Cohen

(57) ABSTRACT

A configurable power control system is disclosed. The power control system can include a control module, an enable/disable module coupled to a power rail (i.e. an internal power line) to enable and disable power to the power rail. The system can also include a sequencer module coupled to the first and a second power rail to sequence power to the power rail(s). The system can also include a fault detect module to detect system parameters. Additionally, the system can include a memory module to store user input and can store detected faults to be utilized by the control module and other modules to control interrelationships between the enable module, the sequencer module, the fault detect module, power in, and power provided via the power rails.

16 Claims, 4 Drawing Sheets

| RAIL | TURN-ON DELAY 202 | TURN-OFF DELAY 204 | POWER-GOOD DELAY 206 | OOVP SENSITIVITY 208 | OCP SENSITIVITY 210 | IUVP SENSITIVITY 212 |
|---|---|---|---|---|---|---|
| 0 | 0 | 4 | 1 | | | |
| 1 | 1 | 3 | 1 | R1>2V "HARD STOP" | | |
| 2 | 2 | 2 | 1 | | | |
| 3 | 3 | 1 | 1 | R0>12V "SOFT STOP" | | IV<12V "SOFT STOP" |
| 4 | 4 | 0 | 2 | | | |

FIG.2

| RAIL | OSP (OVER-TIME) | OTP (OVER-TEMPERATURE) | OCP (OVER-CURRENT) | OUVP (OUTPUT UNDER-VOLTAGE) | OOVP (OUTPUT OVER-VOLTAGE) | IOVP (INPUT OVER-VOLTAGE) | IUVP (INPUT UNDER-VOLTAGE) |
|---|---|---|---|---|---|---|---|
| 0 | RESPOND=T DETECT=F | RESPOND=T DETECT=F | RESPOND=T DETECT=F | RESPOND=T DETECT=F | RESPOND=T DETECT=F | RESPOND=T DETECT=F | RESPOND=T DETECT=F |
| 1 | RESPOND=T DETECT=F | RESPOND=T DETECT=F | RESPOND=T DETECT=F | RESPOND=T DETECT=F | RESPOND=T DETECT=F | RESPOND=T DETECT=F | RESPOND=T DETECT=F |
| 2 | RESPOND=T DETECT=F | RESPOND=T DETECT=F | RESPOND=T DETECT=F | RESPOND=T DETECT=F | RESPOND=T DETECT=F | RESPOND=T DETECT=F | RESPOND=T DETECT=F |
| 3 | RESPOND=T DETECT=F | RESPOND=T DETECT=F | RESPOND=T DETECT=F | RESPOND=T DETECT=F | RESPOND=T DETECT=F | RESPOND=T DETECT=F | RESPOND=T DETECT=F |

FIG. 3 ized circuit or chip has become a topic of intense effort.

ARRANGEMENTS FOR INTEGRATED CIRCUIT POWER MANAGEMENT

FIELD OF DISCLOSURE

The present disclosure is related to the field of electronics and more particularly to the field of controlling power in a system.

BACKGROUND

Designers strive to decrease the size and power consumption of electronic equipment, while increasing the speed and functionality of the equipment. As this electronic equipment becomes smaller and faster improved control over the power distribution system on an integrated circuit or chip has become a topic of intense effort. Many electronic products or devices have functional systems on a single integrated circuit (IC) or chip. This configuration is often referred to as a "system on a chip" (SoC). A SoC may have circuits such as a core processor, static random access memory (SRAM), cache memory, registers, branching logic, multiplexers, control features and decision logic that accept inputs and creates outputs. Each of these systems can be connected to different power lines or power rails and power to these subsystems can be controlled by a power controller.

This is important because reducing power to idle subsystems or unused portions of an integrated circuit, for example banks of SRAM, can significantly reduce power consumption within an IC and within the device generally. This active-inactive dichotomy also occurs in register banks, register files, multiplexers, and branching logic to name a few. Other circuits commonly found on microchips include pipeline circuits where flip flops are chained in series where bits of data advance from flip-flop to flip-flop where only the part of the chain that is active needs to be powered. Accordingly, in such configurations not all portions of the circuits need to operate concurrently during specific time intervals. To conserve power, and allow for longer battery life, portions of the SoC can be placed in a sleep mode or even shut down when not in use. Also, for some devices, the entire system can be placed in a sleep mode.

In addition, some circuits perform better with and/or require a slow ramp-up voltage from the sleep mode while others such as a phase locked loop can require a fast ramp or need to achieve a stable operating mode before other circuits that utilize their output are activated. For example, a circuit such as a phase locked loop (PLL) typically provides a clock signal to all synchronized circuits in the integrated circuit and thus, a PLL should be running in a stable mode before any synchronized logic attempts to emerge from a sleep mode. Likewise, some circuits can require a slow transition to a sleep mode to make sure that an orderly shut down occurs while other circuits can require a quick shut down in response to many phenomena such as an over-current detection. It can be appreciated that comprehensive and accurate power control can greatly increase the functionality, efficiency and reliability of an IC and of a device and can significantly increase battery life for mobile devices.

Most traditional motherboards have three categories of integrated circuits including system on a chip (SoC)s that consume power and process data, voltage regulators or VRs devices that deliver power, and power management devices to control the VRs for sequencing, faults, etc. Motherboards may have one or more devices in any category. This "separateness" of the VRs and the power management created deficiencies in operation due to time delay, additional interconnect, etc. A significant limitation of traditional power control solutions is that any single power management device does not perform platform-wide control, sequencing, faults, etc. The scope of its control is typically limited to a subset of the rails in the motherboard. Some techniques, such as a master power management device, required a fourth type of device to coordinate these narrow-scope devices. This is significant because the trend in VRs is to make them "faster" (higher-frequency switching VRs that require faster control in case of faults) and the trend in many electronic devices is to rapidly transition between "active" and "sleep" states (which requires complex flexible control of power sequencing).

BRIEF DESCRIPTION OF THE DRAWINGS

Aspects of the disclosure will become apparent upon reading the following detailed description and upon reference to the accompanying drawings in which, like references may indicate similar elements:

FIG. 2 is a user input matrix for user selectable control of the power system;

FIG. 3 is a fault detect matrix for a power control system; and

DETAILED DESCRIPTION OF EMBODIMENTS

Figure 1:
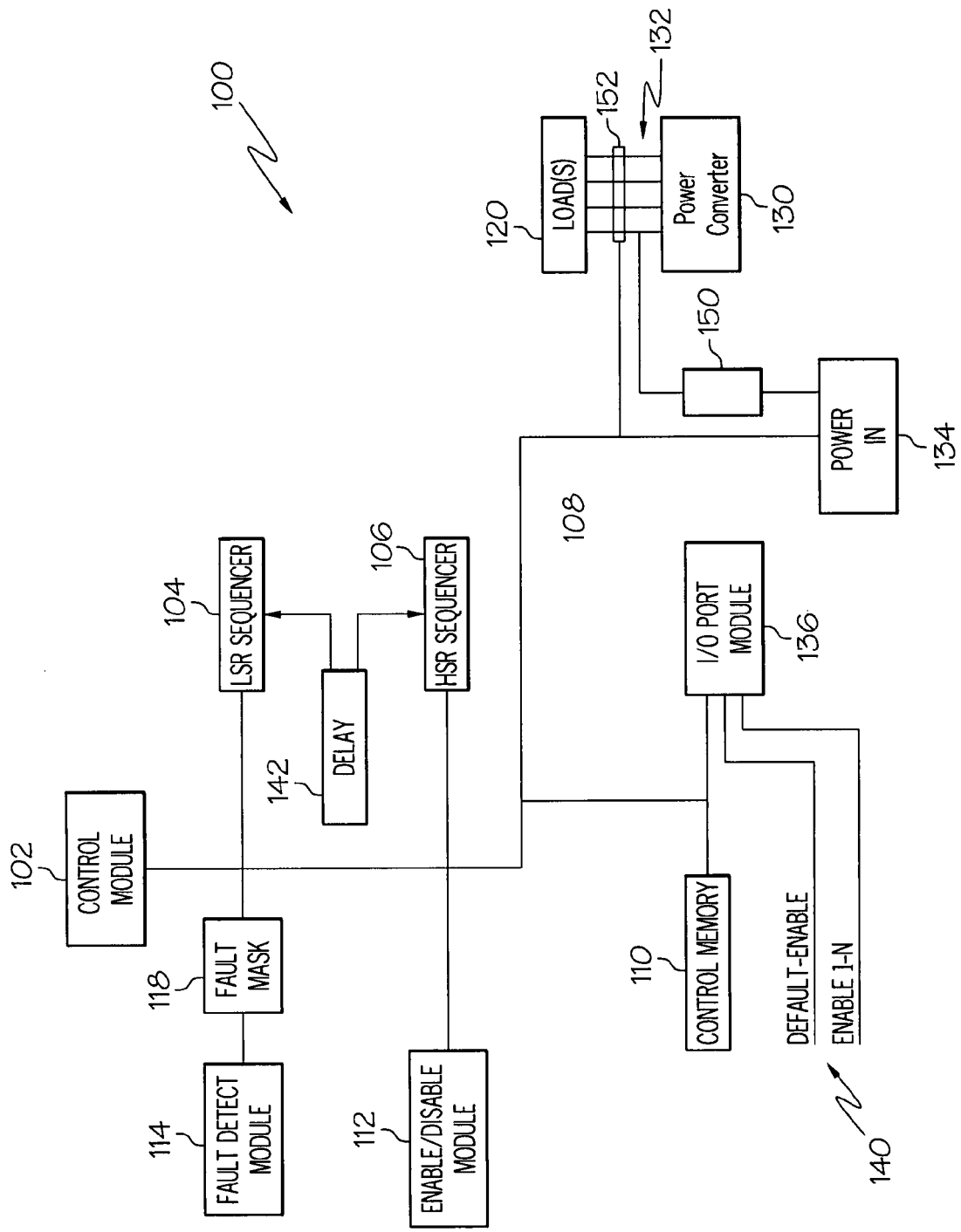
FIG. 1 depicts a block diagram of a power control system.

The following is a detailed description of embodiments of the disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

While specific embodiments will be described below with reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

In one embodiment a platform-wide power management and control system that can control voltage regulators and management power delivery within a single integrated circuit. Such an integrated power management system simplifies motherboard design by collapsing multiple ICs (a processor and a power controller) into one IC, reducing the required interconnect and providing by design that all platform power rails on a mother board are coordinated utilizing inter-related faults, etc. The disclosed arrangements are also well suited to integration with the VR itself to achieve minimal or nearly zero time delays.

In disclosed power control system can include an enable/disable module, a fault detect module and a sequencer module that interact with instructions contained in a memory to control power delivery within an integrated circuit. The enable/disable module can enable and disable power to individual power rails based on the instructions. The sequencer module can sequence or time delay power and power disable signals and soft starts, soft stops, and hard stops in a sequence according to user input. In one embodiment, the sequencer can have two components a high speed rail sequencer and a low speed rail sequencer, and thus high speed rails can be treated differently than low speed rails based on their inherent needs.

Fault detect module can detect faults and store fault signals and possibly send fault signals to the appropriate modules in the system when a fault occurs. Additionally, the system can include a control memory module to store the user input including user selectable/configurable instructions such as control instructions to be utilized by the modules to control interrelationships between the modules. In one embodiment, the user input can be facilitated by dropdown menus, and pick and place selections facilitated by a pointing device such as a mouse. The system can also include an input/out module and a graphical user interface to accept the user input.

The fault detect module can detect an abnormal power condition in the system and a control module, the enable/disable module and the sequencer module can control power delivery according to the user provided/selected instructions. In one embodiment, a fault mask module can filter fault detections that may normally occur under a given set of circumstances such that specific fault conditions can be ignored under certain circumstances. The fault masks can also be set based on user input. The user input can be programmed, entered, compiled, and viewed as bit selection in a matrix configuration.

In another embodiment, a method of controlling power within an integrated circuit is disclosed. The method can include accepting at least one user input, where the instruction can inter-relate power control features between different power rails and can inter-relate detected faults on one or more of the power rails. User input such as power control instructions/configurations can be stored in memory on an integrated circuit and power rails can be monitor in the integrated circuit for a fault in response to the user input. One power rail in the integrated circuit can be sequenced in the integrated circuit in relation to another power rail based on the user input. Also power rails can be enabled and disabled in the integrated circuit in response to the user input.

In one embodiment, a fault that is detected in the system can be masked in response to the user input. Sequencing of power rails can include sequencing high speed rails differently than low speed rails. Power delivery rails can also be configured to softstop or hardstop depending on the user input. The user selectable configuration can be stored as low level code or binary data in a matrix configuration, wherein the matrix can visually interrelate the operating relationships between faults and rails, and between parameters of one power rail and control of another power rail. The user can configure features such as over-current fault isolation, adjustable turn-on ramp and turn-off ramp, and under-voltage and over-voltage monitoring and notification, voltage monitoring and "power good" notification, programmable current regulation, programmable current limit, time to latch off, rail-to-rail common-mode input voltage range, high speed and low speed reactions due to a dead short, and the interrelationship between these phenomena on one or more rails and how to control other rails in response to such selected features and detection of parameters.

Referring to FIG. 1, a programmable power control unit 100 that can be a portion of a system on a chip (SoC) is disclosed. The power control unit 100 can include a control module 102, a fault detect module 114, a low speed rail sequencer 104, a high speed rail sequencer 106, an enable/disable module 112, a control configuration memory module 110 and an input/output module 136. Each module 102, 104, 106 and 112 can be embodied as combinational logic, as a state machine or as software modules that are processed by one or more small dedicated processor(s) or by a shared processor.

In a state machine embodiment, the modules 102, 104, 106 and 112 can all be implemented with register transfer language (RTL) coding. Such a state machine configuration allows the modules to control power transistors (not shown) in power converter 130 that convert the input power to different voltage on the power rails 132 and to soft start/stop hard start/stop the power on the rails. Power converter 130 can accept power from power input module 134, say at twelve volts and convert the input voltage to various voltages such as 0.9 volts, 1.2 volts, 1.7 volts, 2.2 volts, and so on, on individual rails, to meet the various power requirement for subsystems on the SoC (shown as loads 120). Thus, power converter 130 can regulate and control various aspects of the power being supplied to the load or loads 120 via power rails 132. Sensors 152 can be connected to power rails 132 to detect operating parameters of the power rails 132 and can be coupled to various components and modules to detect temperatures of various portions of the integrated circuit, power rail voltage, and/or power rail current. Power sensor 150 can detect parameters of the input power.

The disclosed arrangements can be programmable where a user can select multiple features for one or many power rails 132. Further the user can create interdependent control features or a control instructions that control one or more power rail 132 based on a detected parameter such as input voltage, temperature, or a power rail voltage to name a few. Some other examples, include selecting upper and lower voltage limits that create flags or faults detectable by fault detect module 114, and enable and disable signals via enable disable module 112, selecting how each rail 132 sequences on and off with time delays, hard of soft power up and shut down etc. via sequencing modules 104 and 106.

In one embodiment sequencing parameters can be selected based on past phenomena. For example how fast a rail ramps up or down via sequencing modules 104 and 106 can be different based on whether the system is recovering from a fault, recovering from a sleep mode or just powering up for the first time. In addition, a user can select interdependent control parameters such as if one rail is over current or out of voltage range, another rail that is dependent on the out of range rail will be shut down in a specific manner via control module 102, sequencing modules 104 and 106 an enable/disable module 112. Thus, the control instructions that can be configured and stored in the control memory 110 and are useable/executable by modules 102, 104, 106, 114, and 112 are highly flexible, dynamically reconfigurable, and can be fully modular to permit a straight forward scaling to manage an arbitrary number of independent rails or to create "interdependency" between the control of power rails 132.

Accordingly, the basic arrangements and methods disclosed are universal and the disclosed embodiments can be configured into many types of integrated circuits and then programmed to customize the system for the particular application. Utilizing the input/output module 136, possibly a keyboard, a user can enter control information into control memory 110 to configure or program the system possibly from a graphical user interface. Such user selectable or user configurable parameters or control functions can be utilized by the modules 102, 104, 106, 114 and 112. Such instructions can also include sequencing delay parameters, fault enable masks and fault response masks. In one embodiment, the instructions configuration could be implemented by a processor and could be part of the BIOS, software access, serial bus programming, etc.

In another embodiment, the system 100 can have default settings for power-on and power-off sequencing, with single enabling user input to select such a configuration. In another embodiment, the system can support individual enable signals for each power rail 132 where one signal is provided for each rail 132. Such signals can be also be driven from an external port (I/O port 136) of the SoC that allows an external device, such as an external controller to override the user configured or default sequencing of every rail, via the control module 102.

External control inputs can be received by the system 100 where some signals can be common to all power rails 132 or shared by all rails 132 and some can control individual power rails. For example a DEFAULT_ENABLE signal input pin to the system 100 can control all power rails 132. This signal can also enable a default power-on/power-off sequence for all power rails 132. Other logic inputs such as ENABLE, REGULATED and FAULT_DETECT can be signals available on external pins that are unique for each power rail. For example when an ENABLE signal is asserted on an input pin to the system the power rail associated with the ENABLE signal will be driven to the desired voltage.

The combination of a global DEFAULT_ENABLE input signal and a per-rail ENABLE inputs (collectively illustrated as 140) in addition to utilizing at least a portion of the user configured control parameters can allow for sophisticated internal/external control of the power rails 132. One advantage of such a control feature is that a very flexible distinction between rails that are "always" powered and rails that can be put into a "sleep" mode can be easily configured. In the illustration, only two signals the DEFAULT_ENABLE and ENABLE signals or input pins are illustrated, however, it can be appreciated that these external control inputs and the lines interconnecting the modules 102, 104, 106, 112 etc. represent multiple lines and pins that can carry many discrete control signals, fault signals, etc. mentioned herein.

For example, a REGULATED signal can be "fault" or status type signal that provides an affirmation signal when a supply rail is regulated and operating within the desired or specified voltage. In another example, a FAULT_DETECT signal can provide parallel bits, one per fault type, such that a true bit or an asserted signal can indicate a fault for example, from a voltage or current sensor, on an input or delivery power rail, a thermal sensor output etc. An output signal that can be unique for each rail is a POWERGOOD signal that when asserted can indicate that it is safe or acceptable to operate those components, subsystem or subsystems that are supplied power by a rail.

In one embodiment the control module 102 can be a collection of identical sub-modules, with a single sub-module assigned to each rail. Depending on the nature of the rail or the desired function of the rail, the sub-module may incorporate common power management features such as soft-start, soft-stop, hard-stop, a Voltage IDentification (VID) code programming such as found in the VRD11 or IMVP-6 specification published by Intel corporation in January of 2007 and sleep state programming such as DPRSLPVR or DPRSTP# specification published by Intel January 2007. A VID code can be a binary digital pattern that stipulates a nominal rail output voltage. An n-bit VID can encode up to $2^{**}n$ code-voltage pairs.

The fault detect module 114 can also contain combinational logic to perform fault handling of the power supply rails 132. The fault detect module 114 can be implemented as a collection of identical sub-modules, with one sub-module per rail, and/or a shared matrix of combinational logic. In each sub-module, detected faults can first be filtered by a fault mask module 118. The fault mask module 118 can suppress any fault that occurs due to a control feature and thus can be ignored. Faults or fault signals that require power to be removed from a power rail or power rails can be flagged as requiring either a soft-stop or hard-stop response, where a soft-stop is a gradual turn-off where the voltage decreases slowly and a hard-stop where there is an abrupt voltage drop or turn-off. A programmable command for a specific rail can look as follows:

| SoftStop = | \| (FAULT_DETECT & FaultEnableMask & SoftResponseMask) |
|---|---|
| HardStop = | \| (FAULT_DETECT & FaultEnableMask & (SoftResponseMask) ) |

The fault detect module 114 can monitor each rail as an independent power supply and the control module 102 may allow the modules to control each rail independently. However, via the input output module 136 the user can set control parameters that are stored in the control memory 110, where although the rails may be dependent, such that a fault on one rail (an "aggressor") may require the deactivation of one or more other rails ("victims"). One operation of the fault detect module 114 can be to utilize the fault mask 118 and the control memory 110 to sensitize a rail to faults detected on any other rail per a user selection. The contents of the control memory 110 may be utilized to program the various dependencies among rails.

The SoftStop and HardStop control signals may be generated and executed at any stage of power supply rail sequencing, where one or more rails is deactivated. The SoftStop and HardStop commands can be issued in one of two modes. In the first mode, a rail's turn-on sequence can be an "atomic" function where a rail is sensitized to SoftStop and HardStop commands occur only after the system 100 has determined and asserted the rail is operating acceptably and the rail achieves a POWERGOOD status. In a second mode, a rail's turn-on sequence may be interrupted by a SoftStop or HardStop command before it has reached its nominal output voltage (i.e. before its REGULATED signal input is asserted or before a POWERGOOD status has been achieved).

From the moment a rail's turn-on sequence is initiated, the fault detect module 114 or its sub-module associated with that rail can begin to accumulate faults. In this manner, the fault module 114 may issue simultaneous SoftStop and HardStop commands if faults of unequal severity are detected. Furthermore, even while a rail is responding to a SoftStop or HardStop command, a sub-module associated with the fault detect module 114 can continue to accumulate faults. In this manner, a fault resulting in a rail deactivation may be compounded by further faults during that rail's turn-off sequence.

The enable/disable module 112 can contain all the logic and/or state machines to generate enable signals for the sequencer portion of the control module 102. The enable/disable module 112 can also be implemented as a collection of identical sub-modules, with one sub-module per power rail 132. If a power rail 132 has been deactivated due to a fault condition, the enable module 112 can wait for the appropriate fault recovery before permitting the power rail 132 to be restarted. Otherwise, the enable module 112 can utilize the state of DEFAULT_ENABLE and ENABLE to determine when to start or restart a power rail 132. In one mode if a power rail 132 has accumulated multiple faults in the fault detect module 114, then the recovery mechanism for each and every fault can be satisfied before the enable/disable module 112 will permit the power rail 132 to be restarted. The disclosed arrangements reduce the complexity when compared to traditional solutions. In general, each power rail can be treated as a unique and independent entity. Sequencing can be achieved by staggering of the rail delay timers 142. Fault response dependencies can be linked by a single sensitizing matrix. The system 100 can guarantee that if a power rail is sensitized to a set of faults (faults which may occur on that rail or any other dependent rail) and has been deactivated, that all relevant faults can be cleared before the power rail is permitted to restart.

Traditional power supply controllers have limitations on reconfiguration or require external components to determine a default sequence. The system 100 places very few limitations on control or how external components can control the system 100. The system 100 does not require external components to provide control signals.

Referring to FIG. 2, one embodiment of a user configurable control setting is disclosed. This particular embodiment is for control instructions that can be implemented when the system is detecting one of many faults (i.e. fault A fault B etc.). Other control interfaces may include general start-up, entry into sleep mode, recovery from sleep mode selections etc. Control for five rails is provided on the left vertical axis (i.e. rails 0-4) and 6 types of controls for the rail configurations are provided across the top horizontal axis.

More specifically, a turn-on delay 202 and turn-off delay 204 has been specified for rails zero "0" to four "4" such that as illustrated the rails are enabled in one order and disabled in reverse order. Similarly rails zero "0" to three "3" have been assigned a power-good delay 206 of one "1" unit (say three microseconds), and rail four "4" has a longer delay. An over voltage rail fault 208 selects rail 1 to be shut down with a hard-stop when rail 1 is greater than two volts. Likewise when an over voltage rail fault 208 of rail zero is greater than twelve volts then rail three will shut down with a soft-stop. Column 210 will shut down rails when they are over a specified current and column 212 will for example shut down rail 3 with a soft-stop when the input voltage is less than twelve volts.

FIG. 2 is merely an example of control inputs that can be assigned to rails. For example configurable input parameters for each independent rail can include TurnOnDelay, PowerGoodDelay, TurnOffDelay, FaultEnableMask, FaultMatrixMask, SoftResponseMask, ResetEnableMask, and ResetClearMask. TurnOnDelay can dictate a delay between assertion of a rail's ENABLE signal and its power-on state. PowerGoodDelay can dictate a delay between a rail's REGULATED and assertion of its POWERGOOD flag. TurnOffDelay can be a delay between de-assertion of a rail's ENABLE and its power-off. Such a control matrix can be entered utilizing the input interface and such instructions could be stored in the memory module of FIG. 1.

In one embodiment, based on the control instructions a turn-on sequence of the power rails can be initiated by the enable/disable module asserting a DEFAULT_ENABLE or an ENABLE signal to the power transistors of the individual rails. A turn-off sequence can be initiated by de-assertion of DEFAULT_ENABLE or de-assertion of a rail's ENABLE, or after receiving a SoftStop or HardStop command from the fault detect module. A HardStop command can be prioritized over a SoftStop command due to the urgency generally associated with a HardStop command.

Referring to FIG. 3 a fault register with fault masks is disclosed. Rails 0-3 are represented in the vertical axis on the left side of the table and different faults are represented on the horizontal axis across the top of the page. A TRUE in a column's Detect field can represent that a fault has occurred and can be viewed by a user. A FALSE in a column's Respond field can represent a mask condition such that a corresponding fault, if detected, can be ignored.

In the first column OSP 302 indicates over-time protection, OTP 304 indicates over-temperature protection, OCP 306 indicates over-current protection, OUVP 308 indicates output under-voltage protection, OOVP 310 indicates output over-voltage protection, IOVP 312 indicates input over-voltage protection and IUVP 314 indicates input under-voltage protection. Again the illustrated faults that can be monitored and stored are a small sample of what could be monitored and stored by the system. The fault detect module of FIG. 1 can utilize the control matrix of FIG. 2 and the fault matrix of FIG. 3 to read faults for the different power rails and control the system according to faults and control commands.

Indications of received faults can be latched into a register file/matrix illustrated in FIG. 3 and such data can be accessed by other modules. The fault detection module can look at each fault per rail and generate a soft stop or a hard stop request to the sequencers based on these faults based on the control that is based on such faults. As stated above, the attempt to store faults could be masked by user-selected fault masks. Such masks can also provide flexibility during the platform testing.

Many different fault signals and fault masks can be implemented. Specific commands can be created by the control matrixes disclosed in FIG. 2. For example, a FaultEnableMask can be a bit mask to enable specific power rail faults under certain circumstances. FaultMatrixMask can be a bit mask to sensitize a "victim" rail to faults detected on other rails. SoftResponseMask can dictate a bit mask that defines a fault response as a "soft" or "hard" stop. ResetEnableMask can be a bit mask that defines a fault recovery as requiring toggling of rail's ENABLE signal. ResetClearMask can be a bit mask to define a fault recovery as requiring absence of the fault.

The description below discloses a sample sequential algorithm that the system might perform. The control algorithms below are divided into three basic scenarios: Cases A-D are for turn on, from a loss of input power: Cases E-H are for turn off under normal conditions; and Cases I-J are for turn off under fault conditions.

Turn on from Loss of Power

CASE A, Single rail external control: This mode can be selected by de-asserting the DEFAULT_ENABLE input pin.
1) Initially the rail's ENABLE input pin can be de-asserted.
2) Next, the ENABLE signal can be asserted, and the enable/disable module 112 can assert a signal to LSR and HSR sequencers 104 and 106.
3) The sequencers 104 and 106 can stall control signals for a period of time which is controlled by a TurnOnDelay variable.
4) The rail can then be powered-on. Sensors can detect that a power rail 132 has become regulated at its nominal voltage by monitoring its REGULATED input pin.
5) Sequencers 104 and 106 can stall for a period of time which is controlled by PowerGoodDelay.
6) The power rail's POWERGOOD output pin can then be asserted when the power rail 132 achieves the specified voltages and currents. The POWERGOOD signal can indicate that it is safe to begin operating components systems and subsystems which are supplied by/connected to the subject power rail 132.

CASE B: In a second Single-Rail Mode internal default sequencing can be achieved.
1) In such a mode the DEFAULT_ENABLE input pin can be asserted. Asserting the DEFAULT_ENABLE input pin can bypass the rail's ENABLE input pin. The enable/disable module 112 can assert a signal to the sequencers 104 and 106 and the subsequent actions can be identical to steps 2-6 mentioned above.

CASE C: In a first multi-rail mode, sequencing can be done by an external device. The external device can define an arbitrary turn-on sequence by driving independent ENABLE input pins for each power rail 132. Each power rail 132 can independently perform as per the single-rail behavior.

CASE D: In a second multi-rail mode default sequencing can also be achieved. The assertion of the DEFAULT_ENABLE input pin can trigger all power rails 132 simultaneously. Each rail can independently perform as per the single-rail behavior. Supply sequencing of power rails 132 can be provided by programming unique TurnOnDelay's as in step 3 of CASE A.

Turn Off Under Normal Conditions

CASE E: In this single-rail mode sequencing can be achieved under the control of an external device.
1) Initially, the power rail's ENABLE input pin can be asserted and DEFAULT_ENABLE input pin can be de-asserted.
2) The ENABLE pin can be de-asserted, and the enable/disable module 112 can de-assert a signal to sequencers 104 and 106.
3) Sequencers 104 and 106 can stall for a period of time which is controlled by TurnOffDelay.
4) Then after the power rail reaches the specified voltage the power rail's POWERGOOD output pin can be de-asserted and,
5) The power rail can be powered-off.

CASE F: In another mode for a single-rail embodiment default sequencing can be internally controlled.
1) Initially the rail's ENABLE input pin can be de-asserted and the DEFAULT_ENABLE input pin can be asserted.
2) Next, the DEFAULT_ENABLE can be de-asserted, and the enable/disable module 112 can de-assert a signal to sequencers 104 and 106.
3) Subsequent actions can be identical to steps 3-5 above.

CASE G: In a multi-rail mode sequencing can be done under the control of an external device. The external device defines an arbitrary turn-off sequence by driving independent ENABLE input pins to each supply rail. Each rail independently performs as per the single-rail behavior.

CASE H: A multi-rail second mode internal default sequencing can be achieved. The DEFAULT_ENABLE input pin can be de-asserted to trigger all supply rails simultaneously. Each rail can independently perform as per the single-rail behavior and shut down. Sequencing of power rails 132 can be provided by programming unique TurnOffDelay's as in step 3 of CASE E.

Shut Down for Fault Conditions

CASE I for a single-rail.
1) Initially, the power rail can be activated, and sequencers 104 and 106 can receive a SoftStop or HardStop command from detect module 114.
2) If the rail's POWERGOOD output pin was asserted, it can be de-asserted.
3) The rail can then be powered-off. If a HardStop command was issued the turn-off is "hard"; otherwise the turn-off is "soft."
4) When turn-off is complete, fault recovery is permitted. If recovery for a fault is selected by FaultClearMask, that fault's absence can be detected. For example, if an over-temperature fault causes a rail to be deactivated, a recovery selected by FaultClearMask can require that the over-temperature condition be removed (e.g. by allowing the device to cool). If recovery for a fault is selected by FaultEnableMask, then the ENABLE input pin for that rail can be toggled.
5) The enable/disable module 112 can wait for each fault present to be successfully recovered. Then, sequencers 104 and 106 can behave as if turning-on from loss of input power supply (as in CASE A above).

CASE J: a multi-rail shut down. The fault response and recovery behavior of multiple rails can be similar to that of the response and recovery of a single rail configuration. Because of rail dependencies, a "victim" rail may be deactivated due to a fault on another "aggressor" rail. In this situation, fault recovery of a "victim" rail may require that the fault conditions of the "aggressor" rail be satisfied also.

Traditional power controllers have several limitations that are addressed by the disclosed arrangements. As described above the system described can be dynamically reconfigured to control power supply rails and power supply rail sequencing for turn-on and turn-off for an arbitrary number of power supply rails. The system allows for turn-on after any condition, including cycling of input direct current (DC) power supply, restoration from sleep or idle modes, and recovery from any fault condition or combination of fault conditions. In addition the described arrangements have more than just dynamic re-configurability, but has dynamic re-configurability based on the cycling of the input DC power supply the system can reconfigure itself based on control signals as dictated by the contents of control memory 110. The disclosed arrangements can achieve dynamically reconfigurable fault handling in which each power supply rail may be sensitized to one or more types of faults (over-voltage, over-current, over-temperature, etc).

The disclosed arrangements can achieve dynamically reconfigurable fault handling in which each power supply rail may be sensitized to faults present on any other rail, (i.e. the system can comprehend rail dependencies). The disclosed arrangements can also provide a simple mechanism using one input pin to produce a default power sequence. The combination of this global DEFAULT_ENABLE input and per-rail ENABLE inputs can provide a very flexible distinction between "always" rails and "sleep" rails. In addition, the disclosed arrangements do not require a dedicated bus interface for configuring the system.

When "always rails" and "sleep rails" are utilized, further control can be achieved by creating two additional categories of power supply rails to be sequenced and managed, namely low-speed rails and high-speed rails. In principle, the disclosed arrangements can apply to an arbitrary number of power rails. Alternatively, a generic start-up and shut-down sequence may be defined with specific requirements for soft-start, soft-stop, and calibration. When a fault occurs and the fault detect module requests a soft stop or a hard stop the sequencers 104 and 106 can turn off the power rails and wait for the ENABLE lines or signals to be toggled by the enable/disable module.

The soft start signal from the sequencers can slowly ramp the voltage on selected rails to the target voltage but monitor for faults produced by fault detect module. If a fault occurs, then the soft start process can be interrupted and a stop will be initiated by the fault detect module. If a fault occurs after the modules are in an active state then the POWER GOOD signal/input can be de-asserted. The sequencers can then wait for an interaction from the enable/disable module 112. The HSR sequencer can have the same sequence as the LSR sequencer but in active state they may be able to service a deep sleep mode for integrated circuits. Both sequencer 104 and 106 can have Turn-on-delay, turn-off-delay and power-good-delay control inputs. The delays can be available in a register in the control memory which can be programmed via an input output port.

The ENABLE signal can be qualified in the enable/disable module before it is sent to the sequencers. Initially, or on start up the ENABLE signal can bypass the wait and generate ENABLE signals for the sequencers. In the case where a stop is requested by the sequencers the enable/disable module can look at the fault masks in the fault mask module to determine if the stop is a proper command based on a fault or whether the fault should have been masked. In one embodiment, there can be two sets of mask registers and fault history registers to help the enable/disable module to make a decision on whether to wait or toggle the ENABLE signal immediately.

The disclosed arrangements enable an integrated circuit to be configured such that it guarantees safe and proper power sequencing, but also provides a platform to replace the traditional default sequence control with an expanded sequence algorithm. The disclosed arrangements enable an integrated circuit to be easily reconfigured to support multiple platforms with a single configurable architecture. The disclosed arrangements also support many embodiments for example, as a separate device on a platform board, or it may be fully integrated with another integrated circuit chip, such as a central processing unit or chipset.

The disclosed arrangements can achieve dynamically reconfigurable power supply rail sequencing for turn-on and turn-off for an arbitrary number of power rails. This reconfiguration is applicable to turn-on after any condition, including cycling of input DC power supply, restoration from sleep or idle modes, and recovery from any fault condition including re-configurability immediately following cycling of the input DC power supply.

The disclosed arrangements can achieve dynamically reconfigurable fault handling in which each power supply rail may be sensitized to one or more types of faults (over-voltage, over-current, over-temperature, etc). In addition the disclosed arrangements can achieve dynamically reconfigurable fault handling in which each power supply rail may be sensitized to faults present on any other rail (can process rail dependencies). The arrangements can provide a mechanism using one input pin to produce a default power sequence. The disclosed arrangements can achieve such control without requiring a dedicated internal bus interface for configuration.

Programmability by an external device may be introduced to permit configuration by the platform of all sequencing parameters: TurnOnDelay, TurnOffDelay, PowerGoodDelay, FaultEnableMask, FaultMatrixMask, SoftResponseMask, ResetEnableMask, and ResetClearMask.

Figure 4:
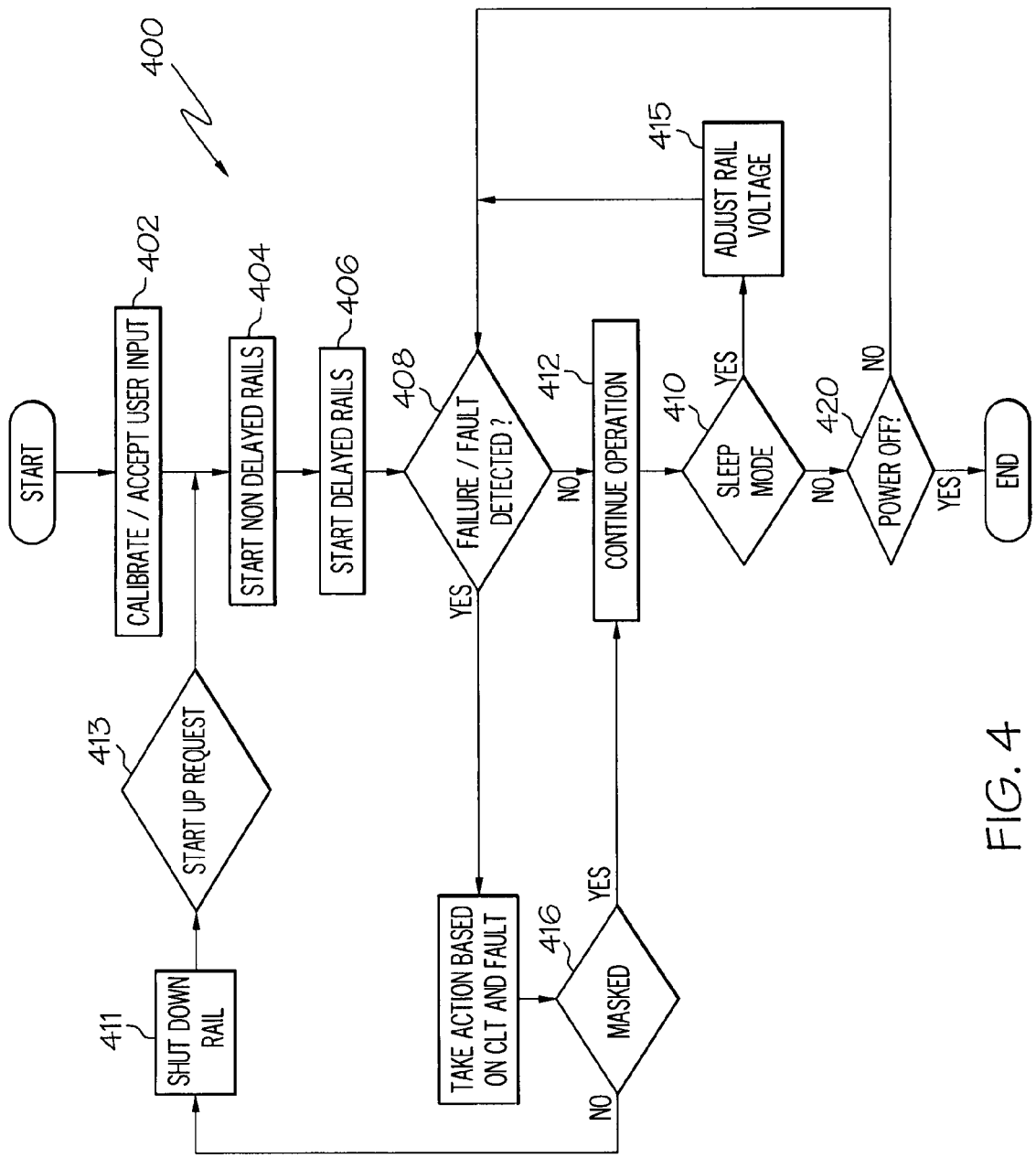
FIG. 4 illustrates a flow diagram of a method for controlling a power delivery system.

Referring to FIG. 4 a flow diagram for a method of controlling power rails on an integrated circuit is disclosed. As illustrated by block 402, the sensors can be calibrated and a user configuration can be accepted and stored. As illustrated by block 404, non-delayed rails can be powered up and as illustrated by block 406, then delayed rails can be powered up. These two different types of power up can further be controlled by a ramp slope setting where the voltage ramp up on a rail may be slower than the voltage ramp up of other rails based on user configurable control instructions.

As illustrated by block 408, it can be determined if a fault or failure has occurred. If a failure has occurred, then the modules can consult the user setting fault masks and control instructions to see what masks are set and what interrelationships have been configured by the user. As illustrated in block 416, if detection of the failure is masked, the process can turn off the rail as illustrated in block 411 and proceed to decision block 413 when it can be determined if a start up request has been received. If a startup request has been received then the process can revert to block 404. If no startup request has been received that the process can end. In block 416 if the fault is not to be masked then the system can continue operation as illustrated by block 412.

In block 408, if no fault is detected then it can be determined if a sleep mode has been requested. If a sleep mode has been requested then the process can adjust the output voltage of specific rails as illustrated by block 415. If, as illustrated by decision block 410 a sleep mode has not been requested then the system can proceed to decision block 420 where it can be determined if power is to be shut off. If the power is to be shut off, the process can end and if power is not to be shut off then the process can move to block 408 and continue to detect failures. Generally the flow diagram serializes what actually runs as four parallel activities. Generally, the Enable/Disable Module can tell the Sequencer when to power-on or power-off a rail; if fault was present, it determines when recovery is achieved. The Sequencer can perform soft-start, power-good, soft-stop, and hard-stop actions with calibration as another optional step. The Control Module can tell the Sequencer what output voltage to deliver by decoding VID and sleep control signals. The Fault Module can tell the Enable module if a fault condition requires a rail to power-off; has its fault "history" erased by Enable after power-off. As stated above the four modules can operate independently and in parallel. Each module can utilize one to several signals to trigger activity in other modules as necessary.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In one embodiment, the arrangements can be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The control module can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present disclosure contemplates methods, systems, and media that can control power rails. It is understood that the form of the arrangements shown and described in the detailed description and the drawings are to be taken merely as examples. It is intended that the following claims be interpreted broadly to embrace all the variations of the example embodiments disclosed.

What is claimed is:

1. A system comprising:
    a plurality of power delivery rails on an integrated circuit to provide power outputs;
    an enable/disable module on the integrated circuit coupled to at least a first rail of the plurality of power delivery rails to enable and disable power to the at least first power delivery rail;
    a sequencer module on the integrated circuit coupled to at least a second rail of the plurality of power delivery rails to sequence power to the at least second power delivery rail of the plurality of power delivery rails;
    a fault detect module on the integrated circuit coupled to at least one of the plurality of power delivery rails to detect one or more system parameters;
    an input interface to the integrated circuit to accept one or more user configurable inputs, the one or more user configurable input to provide control relationships between the one or more system parameters and control of the at least first and second power delivery rail; wherein:
        the input interface is to receive a specification of one of the plurality of power delivery rails and to receive a specification of any combination of faults for any combination of others of the plurality of power delivery rails;
        the fault detect module is to detect the combination of faults for the combination of power delivery rails, in response to the specification of the combination of faults for the combination of others; and
        the enable/disable module is to disable the one of the plurality of power delivery rails and not disable another of the plurality of power delivery rails based upon the detection and the specification of the combination of faults for the combination of others.

2. The system of claim 1, wherein:
    the system further comprises a control memory module to store for the one of the plurality of power delivery rails a matrix of faults and power delivery rails, the matrix to hold a specification of a combination of faults for a combination of the plurality of power delivery rails; and
    the enable/disable module is to disable the one of plurality of power delivery rails based upon the contents of the matrix of faults and power delivery rails.

3. The system of claim 1, wherein:
    the enable/disable module comprises:
        a soft start-up module to enable power to the at least first power delivery rail by a slow start-up, wherein the slow start-up may be interrupted before completion; and
        a hard start-up module to enable power to the at least first power delivery rail by a hard start-up, wherein the hard start-up is to continue until the system asserts that the at least first power delivery rail has reached an acceptable operating limit;
    the input interface is to receive a specification of the type of start-up for the at least first power delivery rail; and
    the enable/disable module is the enable the at least first power delivery rail based upon the specification of the type of start-up.

4. The system of claim 1, wherein the enable/disable module comprises a deep sleep module to place at least a first rail of the plurality of power delivery rails in a sleep mode and to awaken the at least first rail of the plurality of power delivery rails from sleep mode.

5. The system of claim 1, wherein:
    the fault detect module is to continue to detect faults for a rail of the plurality of power delivery rails after the enable/disable module begins to disable the rail based upon detection of a first fault for the rail; and the enable/disable module is to determine that all faults detected during the disabling of the rail are cleared before the enable/disable module is to enable the rail.

6. The system of claim 5, wherein:
    the enable/disable module is to begin a soft shut-down for the rail based upon detection of the first fault;
    the fault detect module is to detect a second fault for the rail before the soft shut-down for the rail is complete; and
    the enable/disable module is to force a hard shut-down for the rail before the soft shut-down is complete.

7. The system of claim 1, wherein:
    the enable/disable module comprises:
        a default enable module to enable all of the plurality of power delivery rails according to a default setting for power-on sequencing upon receipt of a single input; and
        a custom enable module to enable at least one rail of the plurality of power delivery rails according to a custom setting for the at least one rail based upon receipt of an input for the at least one rail; and
    the input interface is to receive an input to enable all of the plurality of power delivery rails pursuant to the default setting and is to receive an input to enable the at least one rail pursuant to the custom setting.

8. The system of claim 7, wherein the input interface comprises:
a default pin to receive an input to activate the default enable module;
an enable pin for at least one of the plurality of power delivery rails to enable the at least one of the plurality of power delivery rails according to a custom setting for the at least one rail; and
a custom enable module to receive a specification of a custom enable for the at least one of the plurality of power delivery rails.

9. The system of claim 1, further comprising:
a reconfiguration module to dynamically reconfigure the system after cycling of the power supply.

10. The system of claim 9, further comprising a control memory module to store reconfiguration data, wherein the reconfiguration module is to reconfigure the system based on control signals as dictated by the reconfiguration data.

11. A method of controlling power comprising:
accepting at least one user input into an integrated circuit, the user input to interrelate power control features between at least two power rails;
storing the at least one user input in memory on the integrated circuit;
monitoring the at least two power rails in the integrated circuit for a fault in response to the at least one user input;
sequencing at least one power rail in the integrated circuit in relation to another power rail in response to the at least one user input;
enabling and disabling at least one power rail in the integrated circuit in response to the at least one user input
receiving a specification of one of the plurality of power delivery rails;
receiving a specification of any combination of faults for any combination of others of the plurality of power delivery rails;
detecting the combination of faults for the combination of power delivery rails, in response to the specification of the combination of faults for the combination of others;
disabling the one of the plurality of power delivery rails and not disabling another of the plurality of power delivery rails based upon the detection and the specification of the combination of faults for the combination of others.

12. The method of claim 11, wherein:
the method further comprises storing in a control memory module a matrix of faults and power delivery rails for the one of the plurality of power delivery rails, the matrix to hold a specification of a combination of faults for a combination of the plurality of power delivery rails; and
the disabling comprises disabling the one of plurality of power delivery rails based upon the contents of the matrix of faults and power delivery rails.

13. The method of claim 11, further comprising:
enabling all of the plurality of power delivery rails according to a default setting for power-on sequencing for the plurality of power delivery rails based upon receipt of a single input;
receiving a custom setting for power-on sequencing for at least one rail of the plurality of power delivery rails; and
enabling the at least one rail of the plurality of power delivery rails according to the custom setting for the at least one rail based upon receipt of the custom setting and based upon receiving an enabling input for the at least one rail.

14. The method of claim 11, further comprising:
place at least a first rail of the plurality of power delivery rails in a sleep mode; and
awakening the at least first rail of the plurality of power delivery rails from sleep mode.

15. The method of claim 11, further comprising:
detecting a first fault for at least one of the plurality of power delivery rails;
beginning to disable the at least one of the plurality of power delivery rails based upon the detection of the first fault;
detecting at least one subsequent fault for the at least one of the plurality of power delivery rails before reenabling the at least one of the plurality of power delivery rails; and
enabling the at least one of the plurality of power delivery rails, the enabling based upon determining that the first fault and the at least one subsequent fault are cleared.

16. The method of claim 15, wherein:
the beginning to disable comprises beginning a soft shut-down for the at least one of the plurality of power delivery rails based upon the detecting the first fault; and
the method further comprises:
detecting a second fault for the at least one of the plurality of power delivery rails before the soft shut-down for the at least one of the plurality of power delivery rails is complete; and
forcing a hard shut-down for the at least one of the plurality of power delivery rails before the soft shut-down is complete.

* * * * *

UNITED STATES PATENT AND TRADEMARK OFFICE
CERTIFICATE OF CORRECTION

| | | |
|---|---|---|
| PATENT NO. | : 7,844,840 B2 | Page 1 of 1 |
| APPLICATION NO. | : 11/731438 | |
| DATED | : November 30, 2010 | |
| INVENTOR(S) | : McShane et al. | |

It is certified that error appears in the above-identified patent and that said Letters Patent is hereby corrected as shown below:

In column 13, line 61-62, in claim 1, delete "rail; wherein:" and insert -- rail, wherein: --, therefore.

In column 14, line 32, in claim 3, delete "is the enable the" and insert -- is to enable the --, therefore.

In column 15, line 34, in claim 11, after "input" insert -- ; --.

Signed and Sealed this
Twenty-second Day of March, 2011

David J. Kappos
*Director of the United States Patent and Trademark Office*